United States Patent
Lange et al.

(10) Patent No.: US 8,317,248 B2
(45) Date of Patent: Nov. 27, 2012

(54) TRIM COVER ARRANGEMENT FOR MOTOR VEHICLES

(75) Inventors: Marcus Lange, Pfungstadt (DE); Tino Schwenk, Rodgau (DE)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 12/753,008

(22) Filed: Apr. 1, 2010

(65) Prior Publication Data

US 2011/0006556 A1    Jan. 13, 2011

(30) Foreign Application Priority Data

Apr. 3, 2009  (DE) .................... 10 2009 016 258

(51) Int. Cl.
*B60R 13/04* (2006.01)
(52) U.S. Cl. ............... 296/1.08; 52/716.5; D12/190
(58) Field of Classification Search ............... 52/287.1, 52/312, 716.1, 716.5, 717.01, 717.04, 717.05, 52/717.06; 296/1.08, 146.15, 190.1; 428/31; D12/190
See application file for complete search history.

(56) References Cited

U.S. PATENT DOCUMENTS

| | | | |
|---|---|---|---|
| 3,338,007 A | 8/1967 | Draplin | |
| 3,383,823 A * | 5/1968 | Bono, Jr. | 52/716.5 |
| 3,638,361 A * | 2/1972 | Church | 49/479.1 |
| 3,756,636 A * | 9/1973 | Jackson | 403/402 |
| 4,010,573 A * | 3/1977 | Andrzejewski | 49/479.1 |
| 4,160,052 A | 7/1979 | Krysiak et al. | |
| 4,365,443 A * | 12/1982 | Miura | 49/502 |
| 4,366,196 A * | 12/1982 | Maekawa et al. | 428/31 |
| 4,738,069 A * | 4/1988 | Williams | 52/658 |
| 5,261,721 A * | 11/1993 | Conger et al. | 296/146.15 |
| 5,697,644 A * | 12/1997 | Logan et al. | 280/848 |
| 6,022,065 A * | 2/2000 | Stopp et al. | 296/146.15 |
| 6,189,956 B1 * | 2/2001 | Fuchs et al. | 296/190.1 |
| 6,918,223 B2 * | 7/2005 | Neidlein | 52/716.6 |
| 7,044,524 B2 * | 5/2006 | Luetze et al. | 296/1.08 |
| 7,055,291 B2 * | 6/2006 | Nakanishi et al. | 52/716.5 |
| 7,600,806 B2 * | 10/2009 | Arai et al. | 296/146.15 |
| 8,033,587 B2 * | 10/2011 | Yanai | 296/1.08 |
| 8,109,532 B2 * | 2/2012 | Schirm et al. | 280/730.2 |
| 2002/0096912 A1 * | 7/2002 | Page | 296/189 |

(Continued)

FOREIGN PATENT DOCUMENTS

DE    850997 C    9/1952

(Continued)

OTHER PUBLICATIONS

German Search Report, German Search Report for Application No. 102009016258.5, dated Nov. 17, 2009.

*Primary Examiner* — Glenn Dayoan
*Assistant Examiner* — Paul Chenevert
(74) *Attorney, Agent, or Firm* — Ingrassia Fisher & Lorenz, P.C.

(57) ABSTRACT

A trim cover arrangement is provided for attachment to a motor vehicle body with a first and second trim cover profile that each can be connected with the body, and are adjacent to each other on the body in the assembly position. At least one of the profiles facing the other profile comprises pointed and/or sharp-edge bounded visible surface that is outwardly visible in the assembly position, which is formed by an at least regionally overlapping arrangement of the first and second profile.

13 Claims, 4 Drawing Sheets

U.S. PATENT DOCUMENTS

| | | | |
|---|---|---|---|
| 2007/0094997 A1* | 5/2007 | Katakura et al. | 52/716.5 |
| 2010/0313487 A1* | 12/2010 | Ellis et al. | 49/502 |
| 2010/0327622 A1* | 12/2010 | Lauderlein et al. | 296/146.15 |
| 2011/0187141 A1* | 8/2011 | Yanai et al. | 296/1.08 |

FOREIGN PATENT DOCUMENTS

| | | | |
|---|---|---|---|
| DE | 1900480 A1 | | 8/1970 |
| DE | 2603849 A1 | | 8/1977 |
| DE | 7825230 U1 | | 8/1978 |
| DE | 2834877 A1 | | 3/1979 |
| DE | 3031623 A1 | | 3/1982 |
| DE | 3605604 A1 | | 8/1987 |
| DE | 4105032 A1 | | 8/1992 |
| DE | 4142599 A1 | | 6/1993 |
| DE | 19803402 A1 | | 8/1998 |
| DE | 29801578 U1 | | 8/1998 |
| DE | 29902938 U1 | | 5/1999 |
| DE | 10346495 A1 | | 5/2005 |
| DE | 102004052237 A1 | | 5/2006 |
| DE | 102006038658 A1 | | 2/2008 |
| EP | 587428 A1 | * | 3/1994 |
| FR | 2561741 A1 | * | 9/1985 |
| JP | 60166515 A | * | 8/1985 |
| JP | 62077260 A | * | 4/1987 |
| JP | 62283018 A | * | 12/1987 |
| JP | 04031124 A | * | 2/1992 |

* cited by examiner

TRIM COVER ARRANGEMENT FOR MOTOR VEHICLES

CROSS-REFERENCE TO RELATED APPLICATION

This application claims priority to German Patent Application No. 102009016258.5, filed Apr. 3, 2009, which is incorporated herein by reference in its entirety.

TECHNICAL FIELD

The present invention relates to a trim cover arrangement for attachment to the body of a motor vehicle with a first and second trim cover profile, which each can be connected with the body, and are adjacent to each other on the body in the assembly position.

BACKGROUND

Trim covers and trim cover arrangements are used for a great variety of purposes in the automotive field. They are arranged in the most varied of configurations, preferably on the outwardly visible exterior side of the vehicle body, such as in the area of the A, B or C-column, especially in the edge area of window openings in the vehicle body. In addition to offering as high quality an optical and haptic appearance, a trim cover is to take up only a slight amount of space for transportation purposes. Further, such covers must be inexpensive to manufacture, and attachable to the vehicle body in as simple and reliable a manner as possible.

Known from DE 10 2006 038 658 A1 is a trim cover for attachment onto a frame section of a vehicle body that exhibits an outer cover that covers an exterior portion of the frame section, and attachment means for latching the outer cover to the frame section. Further provided is a U-shaped receptacle for the inner cover that exhibits the outer cover, wherein the profile legs formed by the outer cover and inner cover expand during an upward sliding motion. The trim cover can subsequently latch entirely onto the frame section by gripping at least a portion of the frame section like tongs.

Even though such a trim cover enables an attachment to the motor vehicle body without using adhesives, the process of forming transitional areas between adjacent trim covers is complicated and difficult.

In particular in arrangements of trim covers in the area of a window opening, which are completely or at least regionally to be encased continuously by one or more trim covers, the process of assembling the trim covers sometimes proves to be complicated and expensive, especially where they abut. This holds true all the more so if special requirements relating to design and shape are placed on the configuration of the area where two adjacent trim covers abut.

If two adjacent trim covers run at roughly one angle relative to each other, and at least one of the trim covers is to exhibit an outwardly visible, pointed or sharp-edged geometry in a transition or abutment area that forms in the process, it yields a difficult situation with respect to stability and manufacturability of the trim covers, and the ability to mount them to the vehicle body.

In addition, sharp-edged or pointed outer geometries of such trim covers pose a certain risk of injury to the assembler. Further, during the formation of sharp-edged or pointed outer contours for trim covers, care must be taken that the latter do not generate any projecting pointed or sharp edges during exposure to external forces and stresses, such as wind while driving or cleaning brushes at a carwash, which might pose a danger to the vehicle operator.

Therefore, at least one object of the present invention is to provide a trim cover arrangement for a motor vehicle body that exhibits outwardly visible, sharp-edged and/or pointed outer contours that have a sufficiently stable design and can easily withstand external stresses. In addition, the trim cover arrangement is to be inexpensive to manufacture, and enable a simple final assembly to the motor vehicle body. In addition, despite the formation of a visibly sharp-edged and/or pointed geometry, the trim cover arrangement is not to pose any health risk whatsoever to the assembler or vehicle operator. Furthermore, other objects, desirable features, and characteristics will become apparent from the subsequent summary and detailed description, and the appended claims, taken in conjunction with the accompanying drawings and this background.

SUMMARY

The trim cover arrangement according to an embodiment the invention is provided for attachment to a motor vehicle body. It exhibits at least a first and a second trim cover profile, wherein each of the profiles can be connected with the respective body. In addition to adhesive bonds, the attachment mechanism can also consist in particular of a positive or non-positive connection.

The two trim cover profiles abut each other when mounted to the body, and form a corresponding abutment or transition area. It is here provided in particular that at least one of the profiles facing the other profile exhibits an outwardly visible, pointed and/or sharp-edge bounded visible surface when assembled to the vehicle body, which is formed by an at least regionally overlapping configuration of the first and second profile. In other words, an at least regionally overlapping configuration of the first and second profile is provided to form the pointed and/or sharp-edge bounded visible surface.

Based on the outer contour and shape of the two profiles in their overlapping transition area, an outwardly visible surface of one of the profiles that satisfies the design requirements can be formed without impairing the stability of the trim cover arrangement.

The pointed visible surface has a distinctly smaller width transverse or inclined, preferably perpendicular to the lengthwise extension of the profile than the profile width lying outside the abutment area. It is here provided in particular that the width of the outwardly visible tip correspond to at most approximately ⅓, ⅕ or even just 1/10 of the overall profile width.

A first embodiment of the invention provides that the first profile facing the second profile exhibits an end section that tapers at least regionally and is regionally inclined at least relative to the lengthwise direction of the profile. The visible surface of the first profile that tapers to a point toward the second profile and/or is bounded by sharp edges can be designed based on this inclined configuration.

It is here advantageously provided in particular that the first profile facing the second profile toward its free end exhibits an incline that borders the pointed and/or sharp-edged visible surface, and is abutted by an extension offset in the transverse direction of the profile. In the assembled position, this offset extension advantageously comes to lie between the second profile and the outside of the vehicle body. As a result, the extension is at least regionally covered by an end section of the second profile that faces the first profile.

Finally, this covered or overlapping area can be provided with an attachment of both trim cover profiles to each other that exhibits a high enough structural stiffness and stability, while the visible surface of the first profile that abuts the extension is preferably joined flush with the outer contour of the second profile.

An advantageous further development of the invention provides that the second profile exhibits a shape that corresponds with the incline of the first profile, and covers the extension of the first profile to the outside after final assembly of both profiles to the vehicle body. The at least regionally overlapping or covered configuration of the facing end sections of the first and second profile occurs predominantly in the transverse direction of the vehicle.

A further embodiment of the invention provides that the extension of the first profile exhibits at least one guide directed toward the profile center for introduction or placement in a U-profile shaped receptacle of the second profile. The extension of the first profile preferably does not completely extend over the profile cross section, but rather only regionally. Preferably provided in the transverse direction of the profile and abutting the extension is a recess, in which the end section of the second profile corresponding with the extension of the first profile and exhibiting a receptacle comes to line.

In another embodiment of the invention, the second profile advantageously exhibits an outer cover unit and a carrier connected thereto. The carrier here lies on the inside, i.e., faces the outside of the body, while the cover unit constitutes the actual cover visible from outside. The carrier is preferably made out of metal or a composite material, and preferably exhibits an integrated attachment means for arrangement on the motor vehicle body.

The carrier is preferably joined with the cover unit in a prefabricated manner. The cover unit can here be designed as a plastic strip, and joined positively and/or non-positively with the carrier, for example in an injection molding process.

An advantageous further development of the invention provides that the carrier of the second profile exhibits the U-profile shaped receptacle for the end section, in particular for the extension of the first profile. Instead of a U-profile shaped receptacle completely integrated into the carrier, it can also be provided that the carrier in conjunction with an interior side of the cover unit facing it forms a correspondingly designed U-shaped receptacle or a corresponding receiving gap.

It is also conceivable that the carrier exhibits two legs that extend essentially parallel to the cover unit, and exhibit a slit for receiving the extension formed on the first profile. It can here be provided in particular that the legs are not precisely parallel in design, but rather run toward each other facing away from a reception opening, so that a clamping seat can be established between the two legs when introducing the extension.

Another advantageous embodiment of the invention provides that the first and second profile mutually overlap each other, or arranged in a mutually overlapping manner relative to each other. It is here provided in particular that, in the final assembled position, the end section of the first profile facing the second profile is covered at least regionally by the second profile, while the end section of the second profile facing the first profile, preferably its cover unit, is simultaneously covered at lest regionally by the first profile.

Such a mutually overlapping arrangement of the facing end sections of the first and second profile can be achieved by means of areas that are offset in the transverse direction of the profile.

It is further provided for the mutually covering or overlapping configuration that the cover unit of the second profile exhibits a recess, the edge of which comes to abut the incline of the first profile in the final assembly position. Further, it is provided that a free end section of the cover unit comes to lie between the first profile and vehicle body. Therefore, the first profile preferably exhibits a recess for accommodating the free end of the cover unit of the second profile.

Another embodiment provides that the first and/or second profile facing the body exhibits a C-shaped receptacle to form a positive connection with the body. With respect to the second profile, it is provided in particular that the carrier of this profile exhibit the mentioned C-shaped receptacle. The latter preferably forms a receiving groove open to the outside of the body for a corresponding attachment web arranged on the body, onto which any C-shaped receptacle of the profile(s) can be clipped in the transverse direction of the vehicle or slipped in the longitudinal direction of the vehicle.

It can here be provided in particular that the legs of the attachment groove on the profile side exhibit a back cut, or are at least slightly inclined relative to each other in comparison to the profile surface, so that a dovetailed, positive attachment can be formed during arrangement on the body-side web.

Another advantageous embodiment of the invention provides that the first profile and second profile exhibit different materials, at least on their sides facing away from the body, i.e., on the outwardly visible sides. It can here be provided in particular that the cover unit of the second profile be made out of plastic, while the second profile exhibits a metal or metallically lustrous surface. Reverse configurations and embodiments of metal and plastic components are equally conceivable and encompassed within the framework of the invention.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
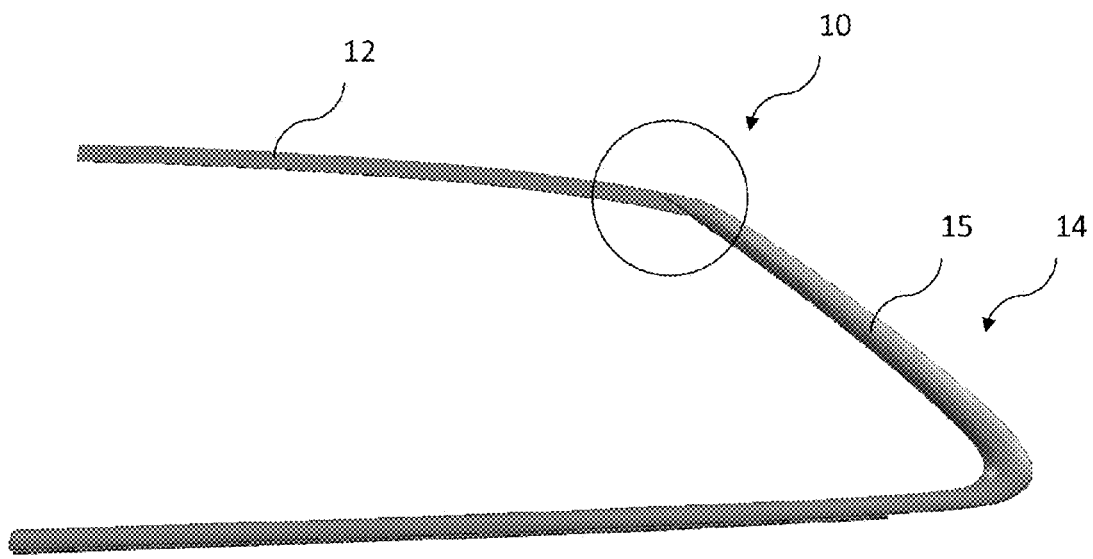
FIG. 1 is a schematic view of the trim cover arrangement with two profiles connected to each other.
Figure 2:
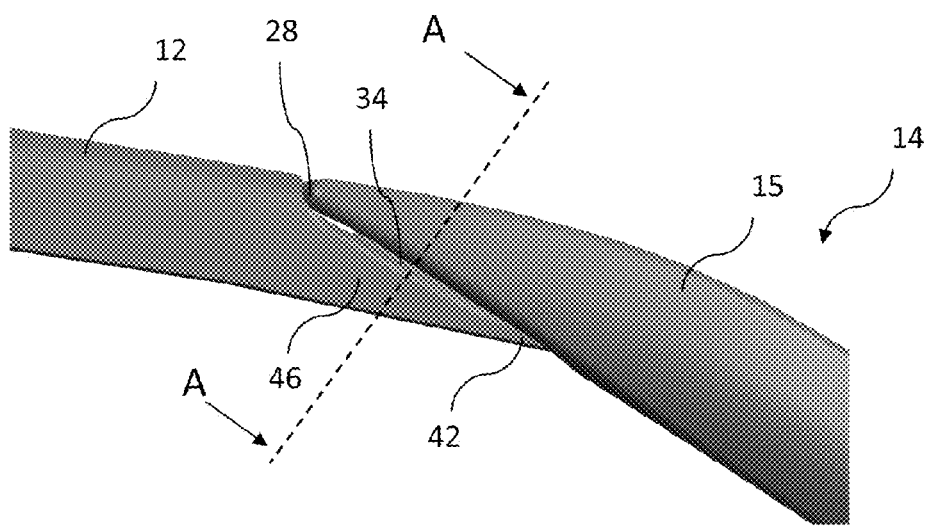
FIG. 2 an enlarged view of the abutment or transition area of both profiles.

The trim cover arrangement 10 shown in its entirety on FIG. 1 exhibits two trim cover profiles 12, 14 that abut each other in an upper right-hand corner area, which run toward each other tapering to a point in their transition area, a magnified view of which is depicted on FIG. 2. This trim cover arrangement 10 is provided in particular for cladding a rear window opening of a passenger car, wherein the trim strip 12 is to be arranged on an upper edge section of the window opening bordering the vehicle roof, and the trim cover 14 is to abut the C-column of the motor vehicle.

The two profiles 12, 14 to be joined together differ in terms of their outward appearance at least with respect to coloration and/or material composition. For example, because one of the trim cover profiles 12, 14 exhibits a plastics surface and the other trim cover profile 14, 12 exhibits a metallically lustrous surface, an especially pronounced and prominent configuration can be achieved from a design standpoint in the transition area between both trim cover profiles shown in magnified views on FIG. 2.

The profile 12 bordering the window opening toward the vehicle roof exhibits a pointed visible surface 46 that faces downwardly toward the bordering profile 14, and has a point 42 and relatively sharp and well-defined incline 34 that abuts the bottom side of the profile 14 or its cover unit 15. Correspondingly, the cover unit 15 also tapers to a point to the left, directed toward the profile section 12, and exhibits an end section 28 that runs under the profile 12 at least regionally.

Figure 7:
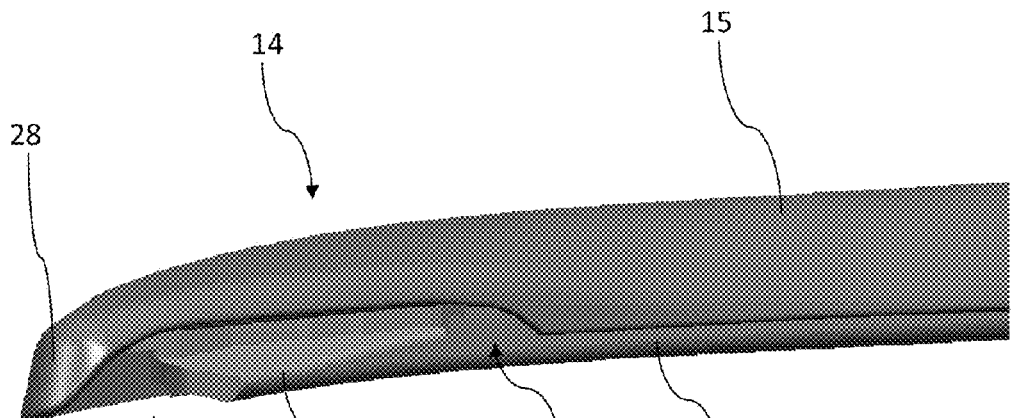
FIG. 7 a perspective view of a trim cover provided with a U-profile shaped receptacle.
Figure 8:
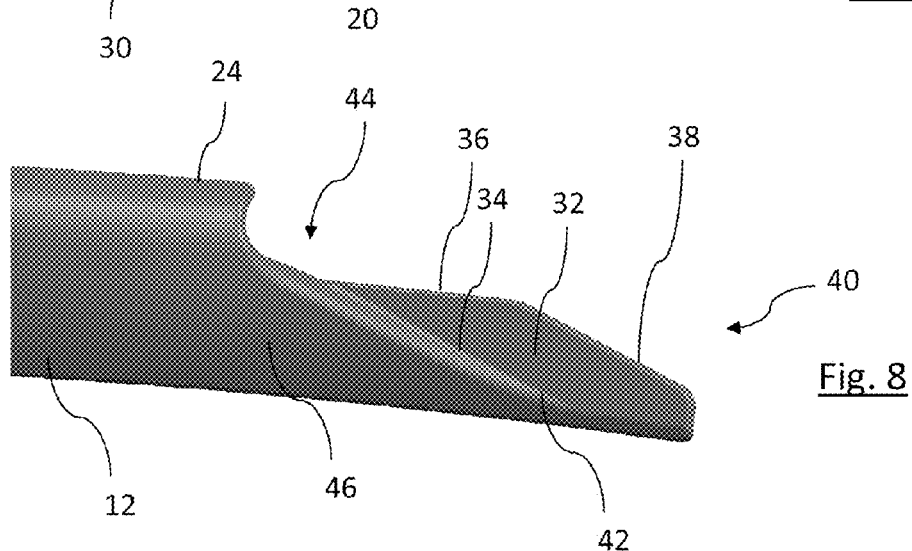
FIG. 8 a perspective view of the trim cover profile end section that can be inserted into the receptacle, outside view.
Figure 9:
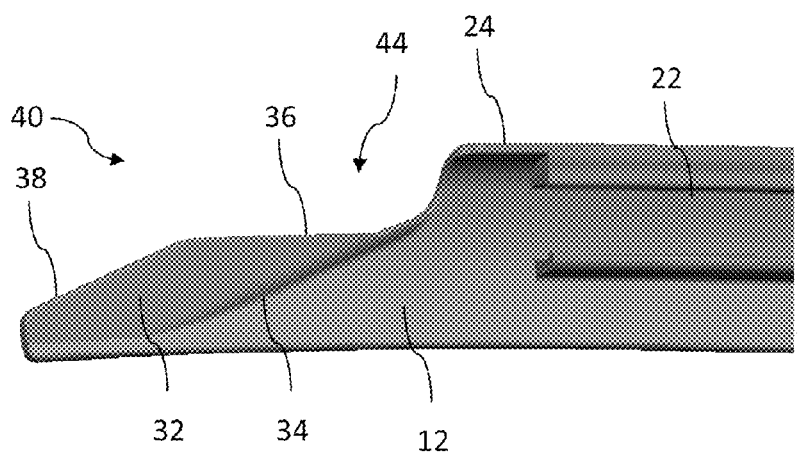
FIG. 9 a perspective view of the trim cover profile section according to FIG. 8, viewed from the vehicle interior.

FIG. 7 to FIG. 9 show a separate perspective view of the two trim cover profiles 12, 14 to be joined together. The profile 12 acting as a trim strip exhibits a visible surface 46 that is bounded by an incline 34. This incline 34 runs downward into the point 42, and is bordered by an extension 32 that is offset relative to the profile plane, and with which the profile 12 is to be introduced into a receptacle 30 formed on the profile 14 designed as a trim cover once the assembly position has been reached on the body.

The extension 32 of the profile 12 here does not extend over the entire profile width. The upper profile section of the profile 12 exhibits a recess 44, in which the incoming pointed end section 28 of the cover unit 15 of the profile 14 comes to lie as the final assembly position is reached. To this end, the cover unit 15 exhibits a recess 50 lying at the bottom and denoted on FIG. 7, with which the cover unit rests on the shoulder formed by the incline 34 of the profile 12 in the assembly position shown on FIG. 2.

The extension 32 exhibits two lateral borders or edge sections 36, 38, the lateral border 36 of which that ends in the incline 34 runs essentially parallel to the outer edge of the profile, while the lateral border 38 that abuts the lateral border 36 runs essentially parallel to the incline 34. It is here further provided that the shoulder formed by the incline 34 or the offset surface of the extension 32 taper toward the tip 42. The extension 32 exhibits the greatest surface offset relative to the visible surface 46 in the area in which the upper lateral border 36 ends in the incline 34, while the surface offset is comparatively low in a lower area of the extension 32 in direct proximity to the outwardly visible tip 42.

In the depiction on FIG. 9, which shows the profile 12 as viewed from the vehicle interior, the C-shaped receiving profile 22 is designed for a latching projection provided on the body and not explicitly shown. The two legs extending essentially parallel to the longitudinal direction of the profile and forming a receptacle 22 are elastically deformable in design to form a latched or clip connection with a web on the body side, so that the trim strip 12 can be secured to the vehicle body merely by being clipped onto a counter-latching element arranged on the body side in essentially the transverse direction of the vehicle.

At the upper edge depicted on FIGS. 8 and 9, the profile 12 exhibits an inwardly reshaped edge section 24. The area between the edge section 24 and beginning of the receiving profile 22 depicted on FIG. 9 simultaneously constitutes a receptacle for the end section 28 of the cover unit 15 of the other profile 14, as illustrated in greater detail on FIG. 5. This end section 28, which is also provided with a rearranged edge section 26, comes to abut the edge section 24 of the profile 12, preferably in a flush manner.

Figure 3:
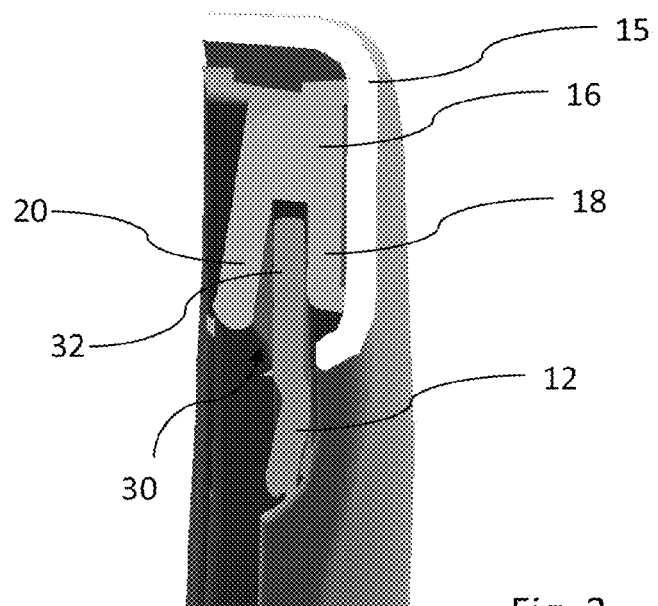
FIG. 3 a cross sectional view of the transition area according to the A-A line of intersection according to FIG. 2.
Figure 4:
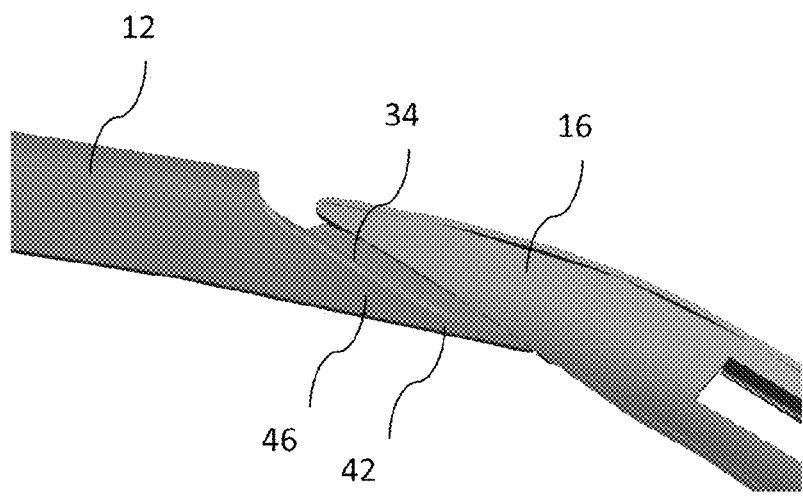
FIG. 4 a view of the transition area corresponding to FIG. 2, but without a cover unit.

The way in which the extension 32 of the profile 12 comes to lie in the downwardly open receptacle 30 of the carrier 16 of the profile 14 is made clearly evident by the cross sectional view according to FIG. 3, which shows a cross section along line of intersection A-A on FIG. 2. In this case, in particular a clamping connection between the extension 32 and U-profile shaped receptacle 30 of the carrier 16 is provided. The carrier 16 exhibits two opposing legs 18 and 20, wherein the outer leg 18 borders the outwardly visible cover body 15 from inside.

The extension 32 not visible in the assembly position and covered by the cover unit 15 makes it possible to achieve a reliable and sufficiently rigid connection between the two trim cover profiles 12, 14, without the need for any other securing or attachment means in the transition area of both trim cover profiles 12, 14.

The receptacle 30 for the carrier 16 and the extension 32 of the cover profile 12 are tailored to each other in such a way that, when the extension 32 has reached a final assembly position in the receptacle 30 formed by the carrier 16, the bottom recess 50 of the cover unit 15 perfectly abuts the offset incline 34 of the trim strip 12. Similarly to the trim cover profile 12, the carrier 16 of the trim cover profile 14 is also designed with a receiving profile 48 for the positive or latching arrangement on the vehicle body, as indicated on FIG. 5 and FIG. 6.

The two opposing legs 18, 20 of the carrier 16 in conjunction with the extension 32 of the trim cover 12 form a clamping seat, wherein the end section 28 of the cover unit 15 facing toward the trim strip 12 comes to lie in the recess 44 of the trim cover 12 provided for this purpose as the final assembly position is reached, at least regionally running under the edge section 24 of the trim cover 12 in the process.

Figure 5:
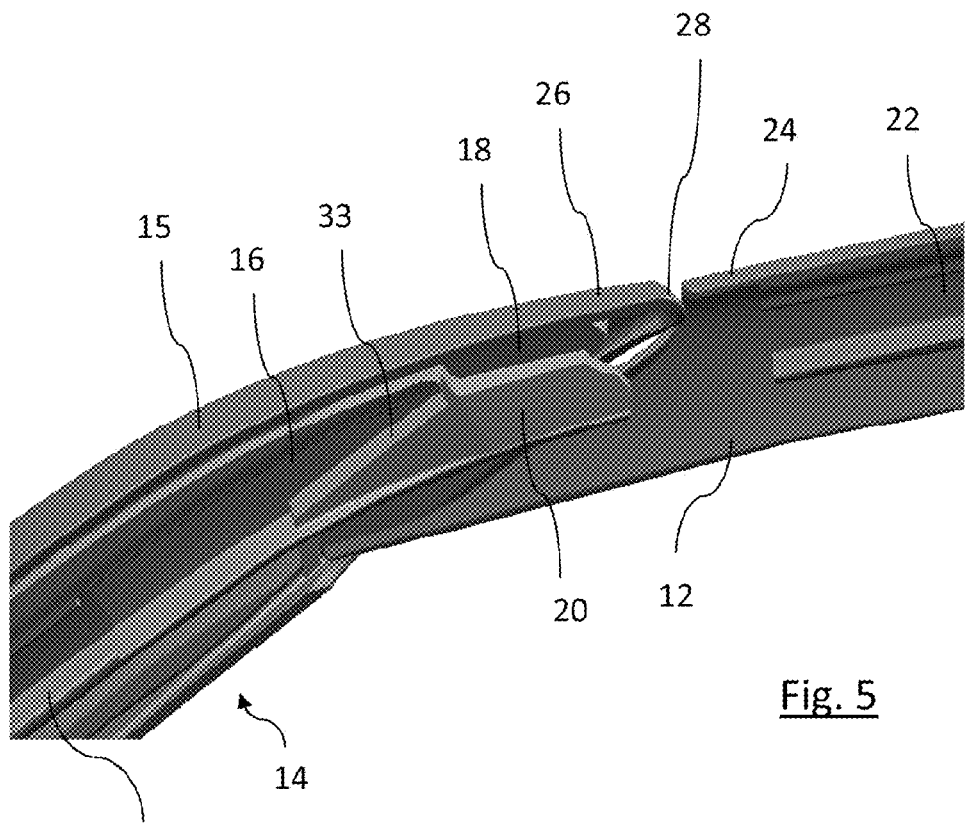
FIG. 5 a perspective view of the transition area according to the depiction on FIG. 2, viewed from the interior of the vehicle.
Figure 6:
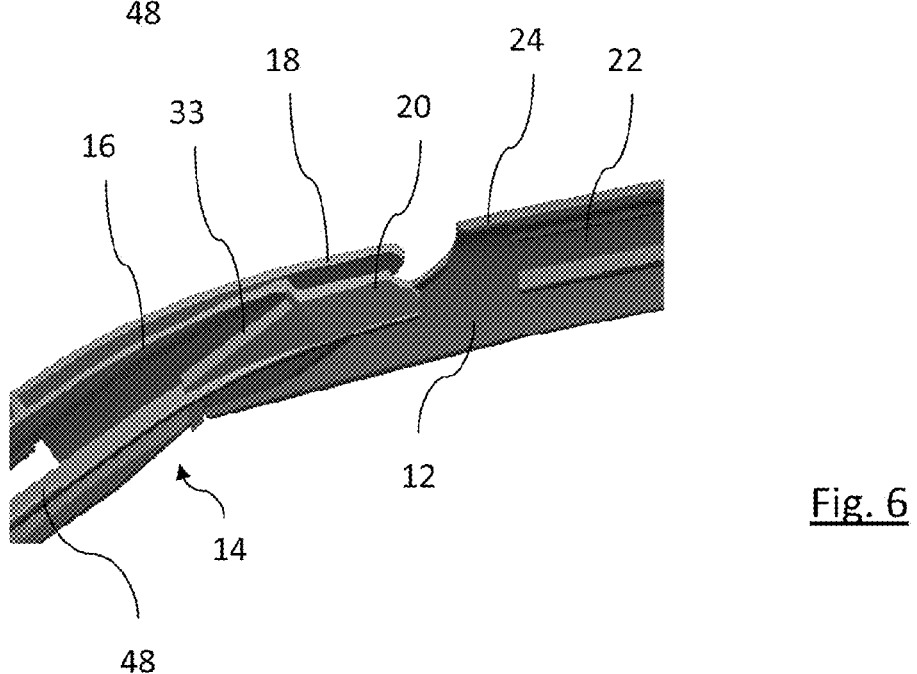
FIG. 6 a view corresponding to FIG. 5, with cover unit removed.

Also shown on FIGS. 5 and 6 is an incline 33 that borders the receptacle 30 of the carrier 16 formed by the two legs 18, 20. This incline 33 corresponds with the lateral border 38 of the extension of the end section 40 of the profile 12 that runs at an inclination relative to the longitudinal direction of the profile, and forms a kind of end stop for the extension when the extension 32 is introduced into the carrier-side receptacle 30.

Because the present trim cover arrangement 10 in the transition area of two trim covers 12, 14 only forms an apparent tip 42 visible from outside, but that same tip 42 visible from outside is abutted by an extension 32 in this structural configuration that is covered by the adjacent trim cover 14 or its cover unit 15, sharp-edged or pointed forms can be created in the transition area of trim covers without requiring a correspondingly pointed configuration of the trim cover profile itself.

As illustrated on FIG. 8, the trim strip 12 exhibits precisely no pointed end section corresponding to the tip 42, but rather a blunt end section, making it possible to advantageously minimize the risk of injury to an assembler or even the end user that would otherwise emanate from the trim strip 12. The alternately overlapping configuration of the trim cover profiles 12, 14 also eliminates the concern that their end sections will detach from each other during exposure to external forces, e.g., when driving through wind or going through a carwash, causing them to be outwardly bent and project in a dangerous way.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A trim cover arrangement for attachment to a motor vehicle body, comprising:
 a first trim cover profile that is adapted for joining with the motor vehicle body; and
 a second trim cover profile that is adapted for joining with the motor vehicle body and abutting the first trim cover profile in an assembly position with the motor vehicle body;
 wherein the first trim cover profile is adapted to face the second trim cover profile and at least one of the first trim cover profile or the second trim cover profile comprises a bounded visible surface that is outwardly visible in the assembly position and formed by at least a regionally overlapping arrangement of the first trim cover profile and the second trim cover profile; and
 wherein a free end of the first trim cover profile comprises an incline that borders the bounded visible surface and abuts by an extension offset in a transverse direction.

2. The trim cover arrangement according to claim 1, wherein the bounded visible surface is a pointed surface.

3. The trim cover arrangement according to claim 1, wherein the bounded visible surface is a sharp-edge surface.

4. The trim cover arrangement according to claim 1, wherein the first trim cover profile facing the second trim cover profile comprises a tapering end section that is regionally inclined at least relative to a longitudinal direction.

5. The trim cover arrangement according to claim 1, wherein the second trim cover profile comprises a shape that corresponds with the incline and in the assembly position is adapted to outwardly cover the extension offset of the first trim cover profile.

6. The trim cover arrangement according to claims 1, wherein the extension offset comprises at least one guide directed toward a profile center for a U-profile shaped receptacle of the second trim cover profile.

7. The trim cover arrangement according to claim 1, wherein the first trim cover profile facing the motor vehicle body comprises a C-shaped receptacle to form a positive connection with the motor vehicle body.

8. The trim cover arrangement according to claim 1, wherein the second trim cover profile facing the motor vehicle body comprise a C-shaped receptacle to form a positive connection with the motor vehicle body.

9. The trim cover arrangement according to claim 1, wherein the first trim cover profile and the second trim cover profile comprise different materials at least on a side facing away from the motor vehicle body.

10. The trim cover arrangement according to claim 1, wherein the second trim cover profile comprises an outer cover unit and a carrier connected to the outer cover unit.

11. The trim cover arrangement according to claim 10, wherein the outer cover unit comprises a recess having an edge that abuts an incline of the first trim cover profile in the assembly position.

12. A trim cover arrangement for attachment to a motor vehicle body, comprising:
 a first trim cover profile that is adapted for joining with the motor vehicle body; and
 a second trim cover profile that is adapted for joining with the motor vehicle body and abutting the first trim cover profile in an assembly position with the motor vehicle body;
 wherein the first trim cover profile is adapted to face the second trim cover profile and at least one of the first trim cover profile or the second trim cover profile comprises a bounded visible surface that is outwardly visible in the assembly position and formed by at least a regionally overlapping arrangement of the first trim cover profile and the second trim cover profile;
 wherein the second trim cover profile comprises an outer cover unit and a carrier connected to the outer cover unit; and
 wherein the carrier comprises a U-profile shaped receptacle for an end section of the first trim cover profile.

13. A trim cover arrangement for attachment to a motor vehicle body, comprising:
 a first trim cover profile that is adapted for joining with the motor vehicle body; and
 a second trim cover profile that is adapted for joining with the motor vehicle body and abutting the first trim cover profile in an assembly position with the motor vehicle body;
 wherein the first trim cover profile is adapted to face the second trim cover profile and at least one of the first trim cover profile or the second trim cover profile comprises a bounded visible surface that is outwardly visible in the assembly position and formed by at least a regionally overlapping arrangement of the first trim cover profile and the second trim cover profile; and
 wherein an end section of the first trim cover profile facing the second trim cover profile is at least regionally covered by the second trim cover profile in the assembly position and a second end section of the second trim cover profile facing the first trim cover profile is at least regionally covered by a section of the first trim cover profile.

* * * * *